United States Patent
Rakshit et al.

(10) Patent No.: US 10,678,417 B1
(45) Date of Patent: Jun. 9, 2020

(54) PRECISION INTERFACE CONTROL

(71) Applicant: INTERNATIONAL BUSINESS MACHINES CORPORATION, Armonk, NY (US)

(72) Inventors: Sarbajit K. Rakshit, Kolkata (IN); John M. Ganci, Jr., Raleigh, NC (US); Martin G. Keen, Cary, NC (US); James E. Bostick, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/191,980

(22) Filed: Nov. 15, 2018

(51) Int. Cl.
*G06F 3/0484* (2013.01)
*G06F 3/0488* (2013.01)
*G06F 1/16* (2006.01)
*G06F 3/01* (2006.01)

(52) U.S. Cl.
CPC .......... *G06F 3/04847* (2013.01); *G06F 1/163* (2013.01); *G06F 3/016* (2013.01); *G06F 3/0488* (2013.01)

(58) Field of Classification Search
CPC .... G06F 3/04847; G06F 3/016; G06F 3/0488; G06F 1/163
USPC ................................. 715/700–866
See application file for complete search history.

(56) References Cited

U.S. PATENT DOCUMENTS

| 6,157,381 | A | * | 12/2000 | Bates | ................. | G06F 3/04855 |
| | | | | | | 345/684 |
| 9,035,898 | B2 | | 5/2015 | Ciesla | | |
| 9,471,216 | B2 | | 10/2016 | Lee | | |
| 2006/0103651 | A1 | * | 5/2006 | Kessler | ............... | G06F 3/04847 |
| | | | | | | 345/440.1 |
| 2008/0049039 | A1 | * | 2/2008 | Berrill | ................ | G06F 3/04847 |
| | | | | | | 345/581 |
| 2012/0019999 | A1 | | 1/2012 | Yao Shao | | |
| 2012/0193211 | A1 | * | 8/2012 | Ciesla | ................... | G06F 3/0202 |
| | | | | | | 200/81 H |
| 2015/0177976 | A1 | | 6/2015 | Ionescu | | |
| 2015/0346888 | A1 | * | 12/2015 | Weyer | .................. | G06F 3/0412 |
| | | | | | | 345/173 |
| 2016/0313830 | A1 | | 10/2016 | Suwald | | |

(Continued)

FOREIGN PATENT DOCUMENTS

WO    2016168097 A1    10/2016
WO    2016209374 A1    12/2016

OTHER PUBLICATIONS

IBM; Radial Scroll Control; IPCOM000179256D; IP.com; Feb. 10, 2009; 3 pages.

(Continued)

*Primary Examiner* — Daniel Samwel
(74) *Attorney, Agent, or Firm* — Schmeiser, Olsen & Watts; Michael A. Petrocelli

(57) ABSTRACT

A method and system for improving user interface precision control functionality is provided. The method includes enabling a helical coil user interface control element of a hardware device. The helical coil user interface control element is connected to a master device requiring control modifications. A command for modifying control functions of the master device is received via interactions from a user of the helical coil user interface control element and control functions of the master device are automatically modified.

16 Claims, 6 Drawing Sheets

(56) References Cited

U.S. PATENT DOCUMENTS

2017/0060100 A1    3/2017  Loi
2017/0067751 A1*   3/2017  Apley ..................... G01W 1/00
2017/0206779 A1*   7/2017  Lee ........................ G06F 3/14

OTHER PUBLICATIONS

Johnston, Casey; Microfluidics panel could add physical buttons to a touch screen; ARS Technica; https://arstechnica.com/gadgets/2014/01/new-rnicrofluidics-panel-could-add-physical-buttons-to-a-touch-screen/; Jan. 23, 2014; 3 pages.

Lovejoy, Ben; Apple patens Apple Watch-style digital crown for iPhone and iPad, hints at bezel-free devices; Jul. 28, 2016; https://9to5mac.com/2016/07/28/digital-crown-iphone-ipad-patent/;10 pages.

Wikipedia; Microfluidics; https://en.wikipedia.org/wiki/Microfluidics; retrieved from the Internet Nov. 15, 2018; 13 pages.

\* cited by examiner

PRECISION INTERFACE CONTROL

FIELD

The present invention relates generally to a method for enabling user interface precision control and in particular to a method and associated system for improving hardware and software interface technology associated with providing an improved interface control element for increasing precision control functionality with respect to adjustable attributes of a device.

BACKGROUND

Accurately enabling control functions for devices typically includes an inaccurate process with little flexibility. Determining operational solutions with respect to modifying control functions of a device may include a complicated process that may be time consuming and require a large amount of resources. Accordingly, there exists a need in the art to overcome at least some of the deficiencies and limitations described herein above.

SUMMARY

A first aspect of the invention provides a user interface precision control improvement method comprising: enabling, by a processor of a hardware device, a helical coil user interface control element of the hardware device; connecting, by the processor, the helical coil user interface control element to a master device requiring control modifications; receiving, by the processor via interactions from a user of the helical coil user interface control element, a command for modifying control functions of the master device; and automatically modifying, by the processor in response to the command, the control functions of the master device.

A second aspect of the invention provides a computer program product, comprising a computer readable hardware storage device storing a computer readable program code, the computer readable program code comprising an algorithm that when executed by a processor of a hardware device implements a user interface precision control improvement method, the method comprising: enabling, by the processor, a helical coil user interface control element of the hardware device; connecting, by the processor, the helical coil user interface control element to a master device requiring control modifications; receiving, by the processor via interactions from a user of the helical coil user interface control element, a command for modifying control functions of the master device; and automatically modifying, by the processor in response to the command, the control functions of the master device.

A third aspect of the invention provides a hardware device comprising a processor coupled to a computer-readable memory unit, the memory unit comprising instructions that when executed by the computer processor implements a user interface precision control improvement method comprising: enabling, by the processor, a helical coil user interface control element of the hardware device; connecting, by the processor, the helical coil user interface control element to a master device requiring control modifications; receiving, by the processor via interactions from a user of the helical coil user interface control element, a command for modifying control functions of the master device; and automatically modifying, by the processor in response to the command, the control functions of the master device.

The present invention advantageously provides a simple method and associated system capable of accurately enabling control functions for devices.

DETAILED DESCRIPTION

Figure 1:
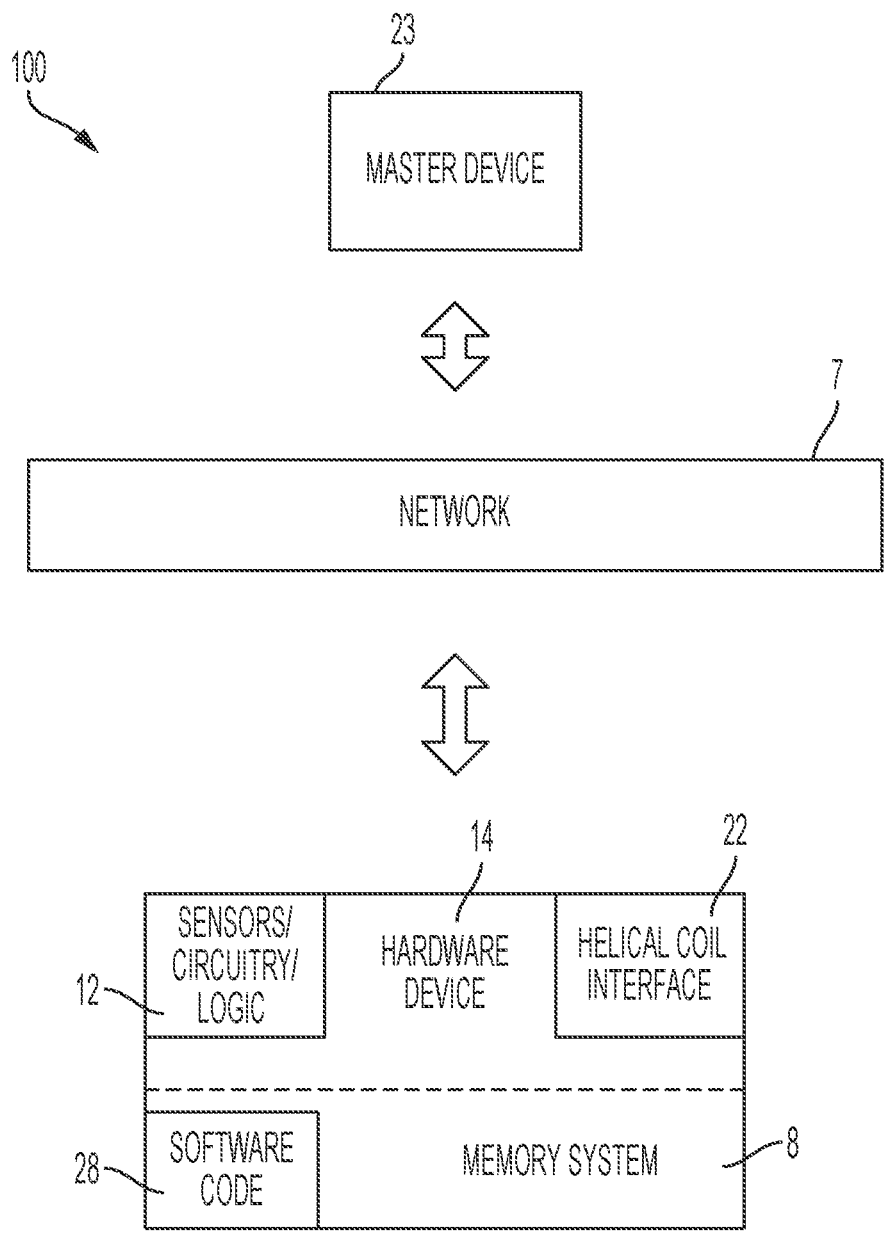
FIG. 1 illustrates a system for improving hardware and software interface technology associated with providing an improved interface control element for increasing precision control functionality with respect to adjustable attributes of a device, in accordance with embodiments of the present invention.
Figure 3:
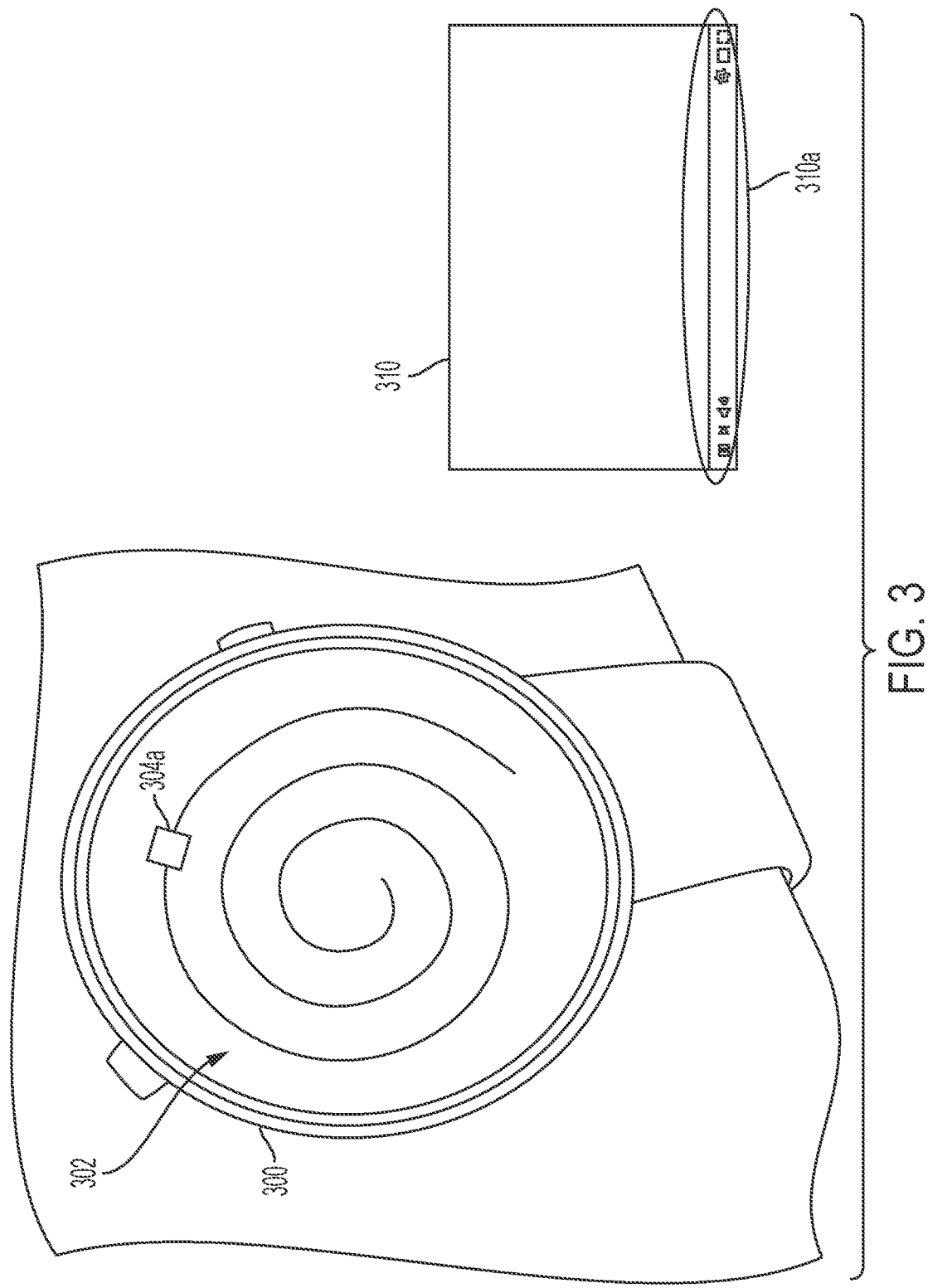
FIG. 3 illustrates an implementation example enabled by the system of FIG. 1 for improving hardware and software interface technology, in accordance with embodiments of the present invention.

FIG. 1 illustrates a system 100 for improving hardware and software interface technology associated with providing an improved interface control element for increasing precision control functionality with respect to adjustable attributes of a device, in accordance with embodiments of the present invention. System 100 is enabled to initiate user interface control via usage of a helical coil interface 22 for modifying menus, scrollbars, and sliders for allowing greater precision control with respect to an interface display of small mobile and wearable devices as an alternative to a linear slider within a system or application implementation. Usage of the helical coil interface 22 with respect to small mobile and wearable devices enables precision control of control functions of a small mobile or wearable device that a linear control may not be able to attain due to size restrictions. Therefore, a user may slide a finger along a line of helical coil interface 22 (as illustrated in FIG. 3, infra) for visually determining a current position on a display device of hardware device 14.

System 100 enables the following functionality with respect to helical coil interface 22 usage:

A user may initiate usage of a helical coil user interface control element and dynamically modify a density of the helical coil thereby increasing a length of a coil line (of the helical coil) for greater precision control. Additionally, the user may receive haptic feedback of the helical coil via usage of a raised microfluidics display structure by implementing microfluidics micro valves or micro pumps within the display structure (e.g., of a mobile device or wearable device) for enabling differing supported helical coil densities with respect to the display device. A cognitive analysis process may be executed for predicting and visualizing a density and position of the helical coil. For example, system 100 enables a cognitive analysis with respect to historical user interaction to predict and recommend an appropriate helical coil density and associated position via usage of color coding the microfluidics a raised line and position (of the raised microfluidics display structure) for current system or application context (e.g., changing a volume for a movie, scrolling to a specified video portion of a video stream, modifying a level of brightness on a display, etc.). Likewise, the cognitive analysis process may be executed with respect to a content type for categorizing and visualizing different portions of content of a menu for the helical coil menu with respect to different user selectable colors. Therefore, system 100 enables precision control for devices of limited size via helical coil interface 22 usage with respect to improved menu, scrollbar, or slider precision for system and application controls.

System 100 of FIG. 1 includes a hardware device 14 and a master device 23 interconnected through a network 7. Hardware device 14 comprises sensors/circuitry/logic 12, a (specialized) memory system 8, and a helical coil interface comprising a control element. Memory system 8 comprises software code 28 including executable code. Memory system 8 may include a single memory system. Alternatively, memory system 8 may include a plurality of memory systems. Hardware device 14 and master device 23 each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, hardware device 14 and a master device 23 may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-6. The specialized discrete non-generic analog, digital, and logic-based circuitry (e.g., sensors/circuitry/logic 12, etc.) may include proprietary specially designed components (e.g., a specialized integrated circuit, such as for example an Application Specific Integrated Circuit (ASIC) designed for only implementing an automated process for improving hardware and software interface technology associated with providing an improved interface control element for increasing precision control functionality with respect to adjustable attributes of a device. For example, hardware device 14 may enable helical coil interface 22 for controlling a functionality of controls (e.g., volume, brightness, video scrolling control, etc.) for hardware device 14. Alternatively, hardware device 14 may enable helical coil interface 22 for controlling a functionality of controls (e.g., volume, brightness, video scrolling control, etc.) for master device 23 (e.g., hardware device 14 may act as a remote control for master device 23 (e.g., a video player)). Hardware device 14 may comprise, inter alia, a mobile device, a wearable Internet of Things (IoT) device, a remote control, etc. Master device 23 may comprise, inter alia, a television, an audio player, an HVAC system, a video player, etc. Sensors/circuitry/logic 12 may include any type of internal or external sensors including, inter alia, GPS sensors, Bluetooth beaconing sensors, cellular telephone detection sensors, Wi-Fi positioning detection sensors, triangulation detection sensors, activity tracking sensors, a temperature sensor, an ultrasonic sensor, an optical sensor, a video retrieval device, humidity sensors, voltage sensors, network traffic sensors, etc. Network 7 may include any type of network including, inter alia, a local area network, (LAN), a wide area network (WAN), the Internet, a wireless network, etc.

Hardware device 14 may comprise a wearable IoT device or a smart phone comprising microfluidics micropumps embedded within a display for creating differing supported density helical coils within the display. The supported density helical coils may comprise different colors to predict and visualize a control position and provide haptic feedback (e.g., a vibration, a pulse, etc.). Additionally, the supported density helical coils may enable gesture (e.g., via finger usage) control for helical coil control by: initiating usage of the helical coil, change a density of the helical coil, and visualizing a predicted helical coil density and position for current context. Wi-Fi/3G connectivity may be enabled for streaming user control and system/application data to a cognitive system. Additionally, hardware device 14 may allow touch interaction and visualization of the helical coil and associated position in combination with color coding. The cognitive system may enable a user control repository to receive device data on from user control functionality. The cognitive system may include a component to correlate context helical coil density and associated position with system and application usage. The cognitive system may include an additional component for predicting and recommending helical coil density and position for context for a user.

Figure 2:
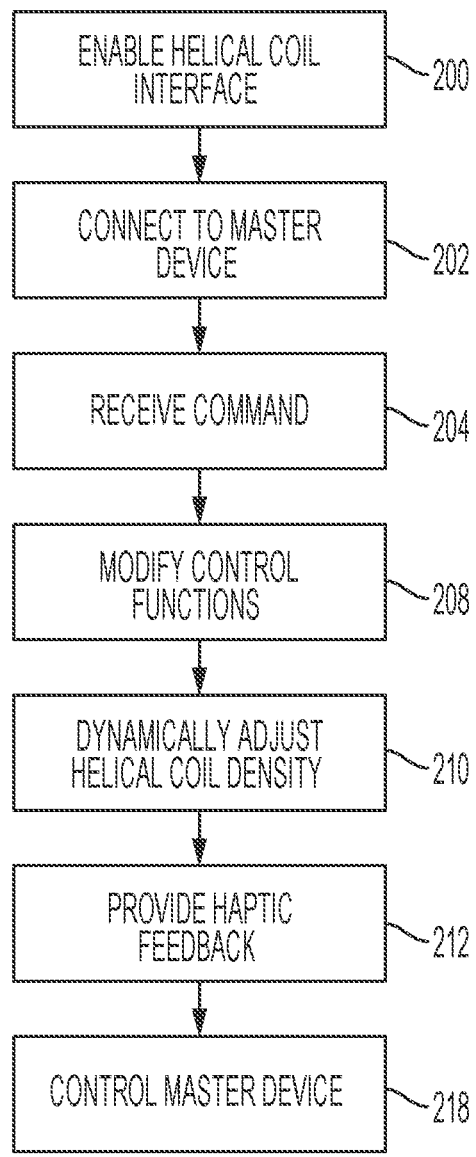
FIG. 2 illustrates an algorithm detailing a process flow enabled by the system of FIG. 1 for improving hardware and software interface technology associated with providing an improved interface control element for increasing precision control functionality with respect to adjustable attributes of a device, in accordance with embodiments of the present invention.

FIG. 2 illustrates an algorithm detailing a process flow enabled by system 100 of FIG. 1 for improving hardware and software interface technology associated with providing an improved interface control element for increasing precision control functionality with respect to adjustable attributes of a device, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by hardware device 14 and master device 23 of FIG. 1. In step 200, a helical coil user interface control element of a hardware device (e.g., a wearable device such as a smart watch or an Internet of Things device) is enabled. The helical coil user interface control element may be located within a display of the hardware device. In step 202, the helical coil user interface control element is connected to a master device requiring control modifications. For example, the master device may require a volume control adjustment. The master device may be internal to the hardware device (e.g., an audio player within a wearable device). Alternatively, the master device may be external to the hardware device (e.g., a television set requiring a brightness control modification). In step 204, a command for modifying control functions of the master device is received via interactions from a user of the helical coil user interface control element. In step 208, the control functions are automatically modified based on the command received in step 204. In step 210, a density of the helical coil user interface control element is dynamically adjusted such that a length of said helical coil user interface control element is increased or decreased resulting in increased or decreased precision when engaging the helical coil user interface control element. Dynamically adjusting the density of said helical coil user interface control element may include mapping a mode for increasing or decreasing (the length of said helical coil user interface control element) to a control action associated with the user. Alternatively, dynamically adjusting the density of said helical coil user interface control element may include predicting a mode for increasing or decreasing (the length of said helical coil user interface control element) based on historical usage of the helical coil user interface control element with respect to the user.

In step 212, haptic feedback is provided to the user. The haptic feedback indicates results of step 208. For example, the helical coil user interface control element may include microfluidic micro apparatuses providing a raised line associated with the helical coil user interface control element and the haptic feedback may be provided via the raised line. Alternatively, the helical coil user interface control element may include a virtual circuit providing a virtual line associated with the helical coil user interface control element and the haptic feedback may be provided via the virtual line.

FIG. 3 illustrates an implementation example enabled by system 100 of FIG. 1 for improving hardware and software interface technology, in accordance with embodiments of the present invention. The example presented in FIG. 3 is described with respect to a user enabling a smartwatch 300 as a remote control integrated with smart device 310 (e.g., television, phone, etc.) for scrolling (via a video scrollbar 310a) to a specific position of a video presented by smart device 310. Smartwatch 300 may include a remote control application for presenting a helical coil structure 302 for scrolling along a coil line 304 (via a scroll line cursor 304a) to control desired position within a video of smart device 310 via control of video scrollbar 310a. System 100 enables the following process for using smartwatch 300 for scrolling (via a video scrollbar 310a) to a specific position of a video presented by smart device 310:

The process is initiated when smartwatch 300 is paired (i.e., connected) to smart device 310 (i.e., a master device). In response, a user initiates usage of helical coil structure 302 as an extension to an operating system and API of smartwatch 300. Controls of operating system and API of smartwatch 300 may be enabled for implementing control of helical coil structure 302 as an alternative to traditional linear slider control functionality. Helical coil structure 302 may be enabled as a system or application design time decision. Alternatively, helical coil structure 302 may be enabled as a real time process for toggling to a helical coil mode via a specific mechanism such as, inter alia, a gesture, a control key, a motion of finger drawing a coil on a device display, etc. Helical coil structure 302 may be implemented directly on smartwatch 300 and/or a display portion of smartwatch 300. A helical coil density of helical coil structure 302 may be dynamically modified such that a length of coil line 304 may be increased for enabling greater precision control. Therefore, a density for a number of coils may be increased dynamically based on user's need for precise control with respect to allowing for an ability to touch specific a line on helical coil structure 302. Additionally, a user may modify a coil line 304 number (i.e., a number of coils of coil line 304) thereby increasing a length of coil line 304 for increasing or decreasing a control sensitivity. For example, coil line 304 may be modified by enabling a user to point a finger in a counter clockwise or clockwise direction for increasing or decreasing a length of coil line 304. Alternatively, a specific user implemented gesture may be mapped to a specific number of coils.

Smartwatch 300 additionally enables a user to receive haptic feedback from helical coil structure 302 via a on raised microfluidics display. A raised microfluidics display includes microfluidics microvalves or micropumps within a display of smartwatch 300 to allow for differing helical coil density attributes of a display. Therefore, a user is able to touch and feel a raised microfluidics line of helical coil structure 302 and receive haptic feedback such as, inter alia, a pulse or vibration at a point of contact, a visual position on helical coil line 304, etc.

A cognitive analysis process may be implemented for predicting and visualizing helical coil density and position such that each user interaction with helical coil structure 302 and/or a specific system or application control is persisted and streamed to a cognitive system for analysis. The cognitive system is configured to correlate: a helical coil density, a position setting on helical coil structure 302, a haptic feedback setting, and color coding for predicted coil and position control settings. The user can may a gesture to visualize and accept a predicted setting or perform a real time touch interaction control with helical coil structure 302. An additional cognitive analysis process may be implemented with respect to a content type to categorize and visualize helical coil structure 302. Likewise, software may be enabled for using natural language processing to identify and categorize content. The categorized content is visually accessible on helical coil structure 302 with different colors representing different categories of content that the user may select and scroll.

Figure 4:
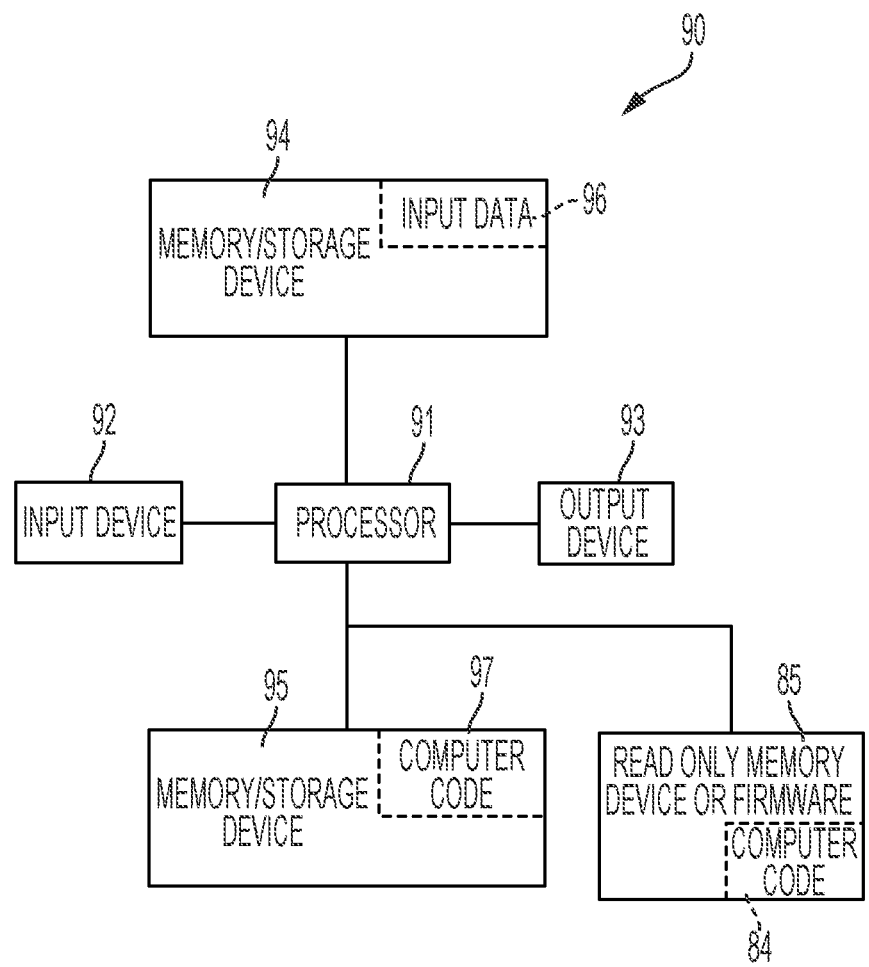
FIG. 4 illustrates a computer system used by the system of FIG. 1 for improving hardware and software interface technology associated with providing an improved interface control element for increasing precision control functionality with respect to adjustable attributes of a device, in accordance with embodiments of the present invention.

FIG. 4 illustrates a computer system 90 (e.g., master device 23 and hardware device 14 of FIG. 1) used by or comprised by the system of FIG. 1 for improving hardware and software interface technology associated with providing an improved interface control element for increasing precision control functionality with respect to adjustable attributes of a device, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 4 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for improving hardware and software interface technology associated with providing an improved interface control element for increasing precision control functionality with respect to adjustable attributes of a device. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve hardware and software interface technology associated with providing an improved interface control element for increasing precision control functionality with respect to adjustable attributes of a device. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving hardware and software interface technology associated with providing an improved interface control element for increasing precision control functionality with respect to adjustable attributes of a device. In another embodiment, the invention provides a business method that performs the process steps of the invention on a subscription, advertising, and/or fee basis. That is, a service supplier, such as a Solution Integrator, could offer to enable a process for improving hardware and software interface technology associated with providing an improved interface control element for increasing precision control functionality with respect to adjustable attributes of a device. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
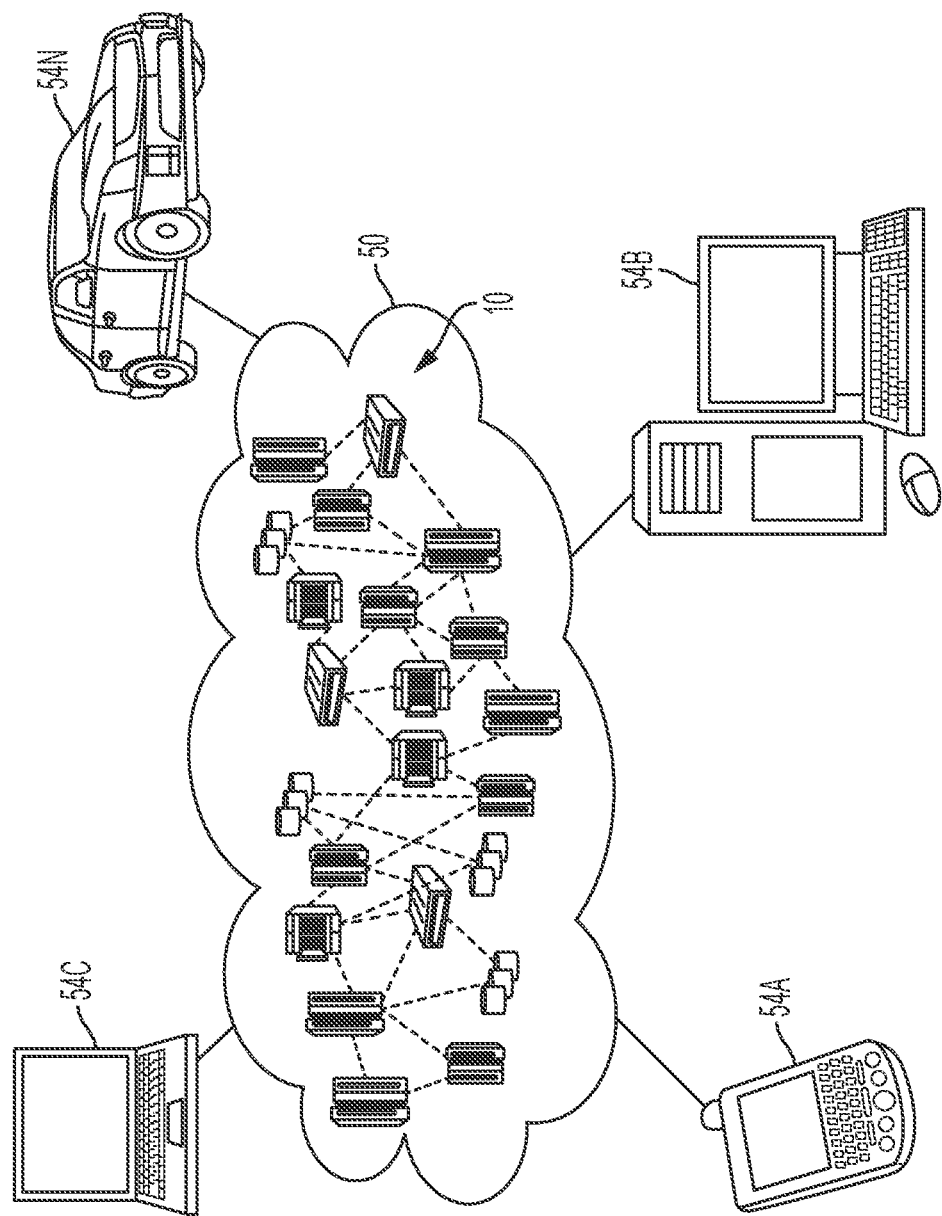
FIG. 5 illustrates a cloud computing environment, in accordance with embodiments of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 5 are intended to be illustrative only and that computing nodes 10 and cloud computing environment 50 can communicate with any type of computerized device over any type of network and/or network addressable connection (e.g., using a web browser).

Figure 6:
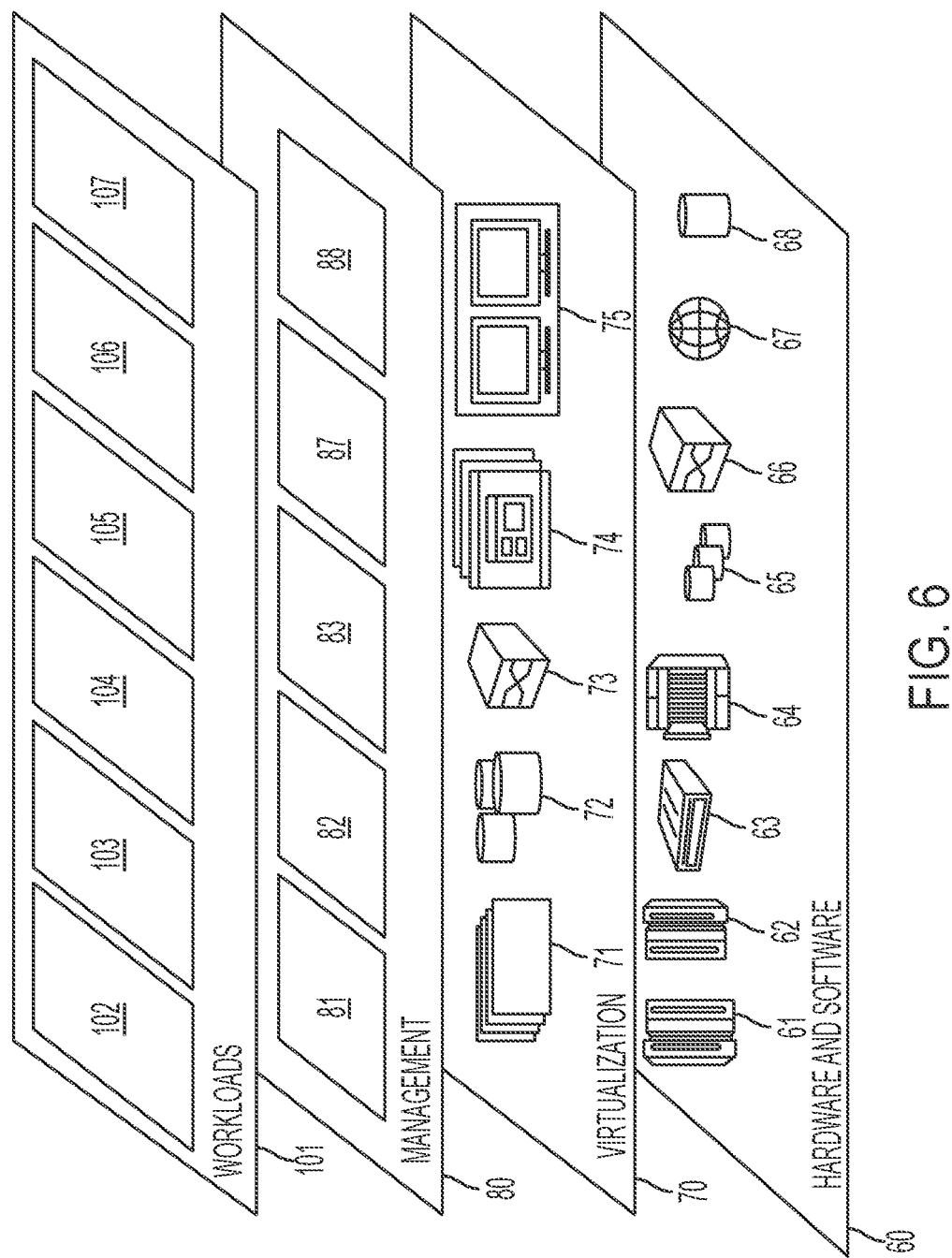
FIG. 6 illustrates a set of functional abstraction layers provided by cloud computing environment, in accordance with embodiments of the present invention.

Referring now to FIG. 6, a set of functional abstraction layers provided by cloud computing environment 50 (see FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 104; data analytics processing 105; transaction processing 106; and improving hardware and software interface technology associated with providing an improved interface control element for increasing precision control functionality with respect to adjustable attributes of a device 108.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A user interface precision control improvement method comprising:
   enabling, by a processor of a hardware device, a helical coil user interface control element of said hardware device, wherein said helical coil user interface control element comprises helical coils of differing colors for prediction and visualization of associated control positions, and wherein said wherein said hardware device comprises a mobile hardware device;
   connecting, by the processor, said helical coil user interface control element to a master device requiring control modifications, wherein said master device is external to said hardware device;
   initiating, by said processor, a connection between said helical coil user interface control element and a control interface of said master device;
   dynamically adjusting, by said processor, a density of said helical coil user interface control element thereby increasing or decreasing a length of said helical coil user interface control element resulting in increased or decreased precision when engaging said helical coil user interface control element;
   receiving, by said processor via touch and gesture control interactions from a user of said helical coil user interface control element, a command for modifying control functions of said master device; and
   automatically modifying, by said processor in response to said command and said touch and gesture control interactions, a position of said control interface of said master device thereby modifying said control functions of said master device.

2. The method of claim 1, wherein said master device is internal to said hardware device.

3. The method of claim 1, wherein said hardware device comprises a wearable device.

4. The method of claim 1, wherein said helical coil user interface control element comprises microfluidic micro apparatuses providing a raised line associated with said helical coil user interface control element, and wherein said method further comprises:
   providing, by said processor via said raised line, haptic feedback to said user, wherein said haptic feedback indicates results of said automatically modifying said control functions of said master device.

5. The method of claim 4, further comprising:
   recording, by said processor, said interactions;
   additionally adjusting, by said processor based on said recording with respect to said haptic feedback, said density of said helical coil user interface control element.

6. The method of claim 1, wherein said helical coil user interface control element comprises a virtual circuit providing a virtual line associated with said helical coil user interface control element, and wherein said method further comprises:
   providing, by said processor via said virtual line, haptic feedback to said user, wherein said haptic feedback indicates results of said automatically modifying said control functions of said master device.

7. The method of claim 1, wherein said dynamically adjusting said density of said helical coil user interface control element comprises mapping a mode for said increasing or decreasing to a control action associated with said user.

8. The method of claim 1, wherein said dynamically adjusting said density of said helical coil user interface control element comprises predicting a mode for said increasing or decreasing based on historical usage of said helical coil user interface control element with respect to said user.

9. The method of claim 1, wherein said helical coil user interface control element is located within a display of said hardware device.

10. The method of claim 1, wherein said hardware device comprises an Internet of Things device.

11. The method of claim 1, further comprising:
    providing at least one support service for at least one of creating, integrating, hosting, maintaining, and deploying computer-readable code in the control hardware, said code being executed by the computer processor to implement: said enabling, said connecting, said receiving, and said automatically modifying.

12. A computer program product, comprising a non-transitory computer readable storage medium storing a computer readable program code, said computer readable program code comprising an algorithm that when executed by a processor of a hardware device implements a user interface precision control improvement method, said method comprising:
    enabling, by said processor, a helical coil user interface control element of said hardware device, wherein said helical coil user interface control element comprises helical coils of differing colors for prediction and visualization of associated control positions, and wherein said wherein said hardware device comprises a mobile hardware device;
    connecting, by the processor, said helical coil user interface control element to a master device requiring control modifications, wherein said master device is external to said hardware device;
    initiating, by said processor, a connection between said helical coil user interface control element and a control interface of said master device;
    dynamically adjusting, by said processor, a density of said helical coil user interface control element thereby increasing or decreasing a length of said helical coil user interface control element resulting in increased or decreased precision when engaging said helical coil user interface control element;
    receiving, by said processor via touch and gesture control interactions from a user of said helical coil user interface control element, a command for modifying control functions of said master device; and
    automatically modifying, by said processor in response to said command and said touch and gesture control interactions, a position of said control interface of said master device thereby modifying said control functions of said master device.

13. The computer program product of claim 12, wherein said master device is internal to said hardware device.

14. The computer program product of claim 12, wherein said hardware device comprises a wearable device.

15. The computer program product of claim 12, wherein said helical coil user interface control element comprises microfluidic micro apparatuses providing a raised line associated with said helical coil user interface control element, and wherein said method further comprises:
    providing, by said processor via said raised line, haptic feedback to said user, wherein said haptic feedback indicates results of said automatically modifying said control functions of said master device.

16. A hardware device comprising a processor coupled to a computer-readable memory unit, said memory unit comprising instructions that when executed by the computer processor implements a user interface precision control improvement method comprising:
    enabling, by said processor, a helical coil user interface control element of said hardware device, wherein said helical coil user interface control element comprises helical coils of differing colors for prediction and visualization of associated control positions, and wherein said wherein said hardware device comprises a mobile hardware device;
    connecting, by the processor, said helical coil user interface control element to a master device requiring control modifications, wherein said master device is external to said hardware device;
    initiating, by said processor, a connection between said helical coil user interface control element and a control interface of said master device;
    dynamically adjusting, by said processor, a density of said helical coil user interface control element thereby increasing or decreasing a length of said helical coil user interface control element resulting in increased or decreased precision when engaging said helical coil user interface control element;
    receiving, by said processor via touch and gesture control interactions from a user of said helical coil user interface control element, a command for modifying control functions of said master device; and
    automatically modifying, by said processor in response to said command and said touch and gesture control interactions, a position of said control interface of said master device thereby modifying said control functions of said master device.

* * * * *